Dec. 29, 1931.  H. W. JONKHOFF  1,838,837
STEERING DEVICE FOR SWIVELING BOGIES OF ROAD VEHICLES
Filed Sept. 15, 1930  2 Sheets-Sheet 1
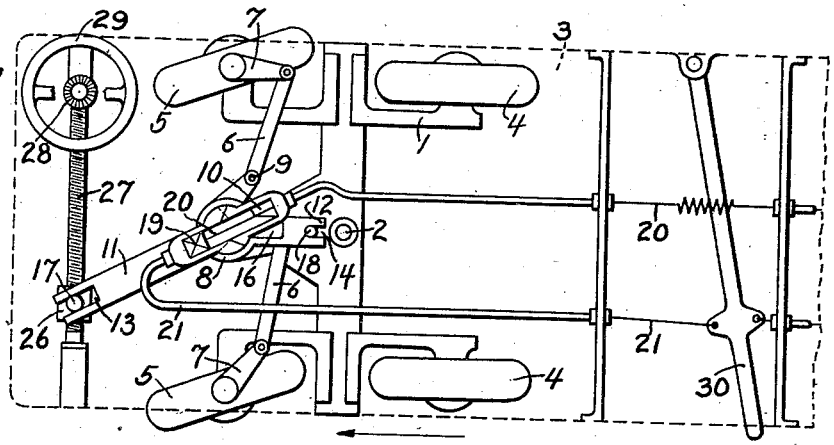
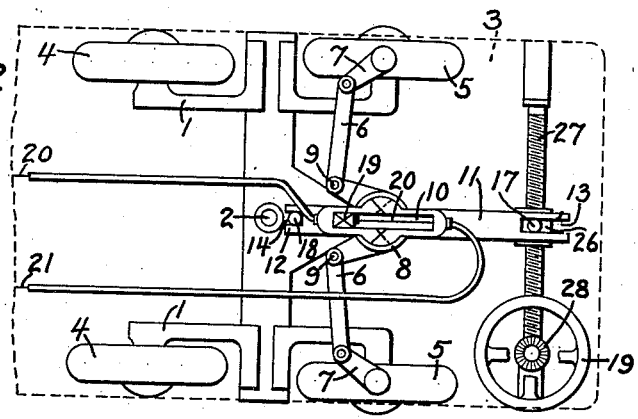
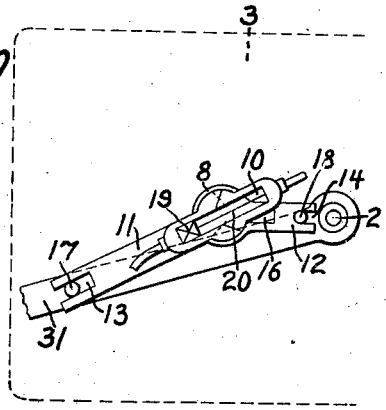
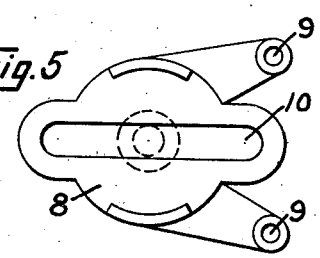
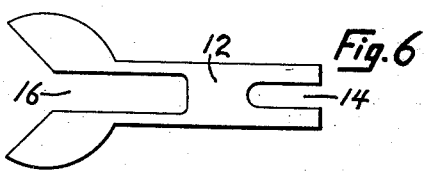
INVENTOR.
H. W. Jonkhoff
BY
C. F. Wenderoth
ATTORNEY.

Dec. 29, 1931.  H. W. JONKHOFF  1,838,837
STEERING DEVICE FOR SWIVELING BOGIES OF ROAD VEHICLES
Filed Sept. 15, 1930  2 Sheets-Sheet 2
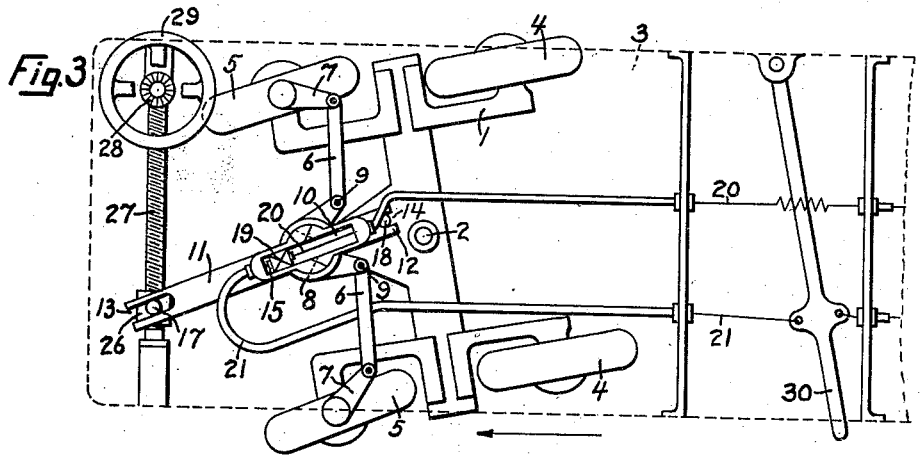
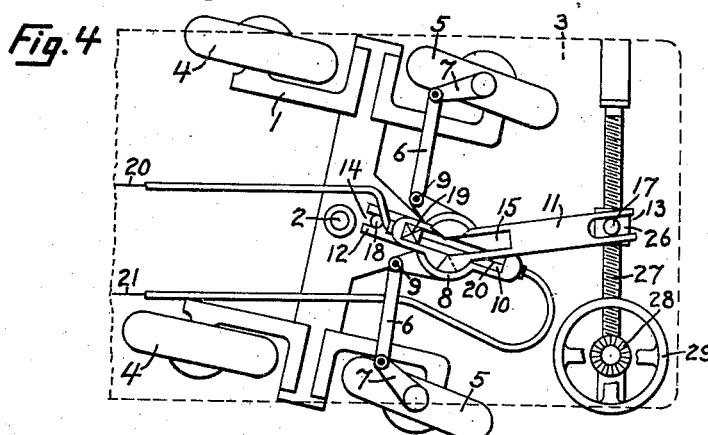
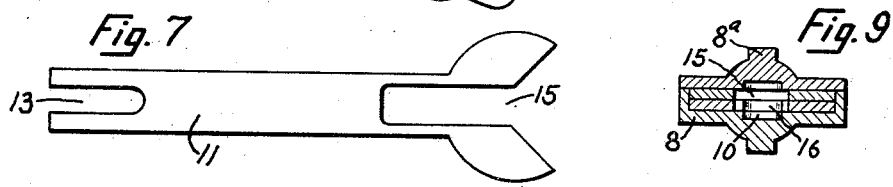
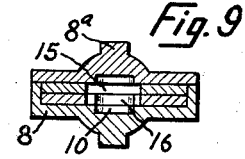
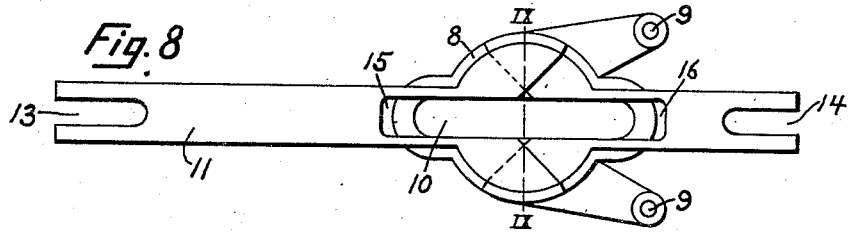
INVENTOR.
H. W. Jonkhoff
BY
C. F. Wenderoth
ATTORNEY.

Patented Dec. 29, 1931

1,838,837

UNITED STATES PATENT OFFICE

HENRI WOUTER JONKHOFF, OF BECKENHAM, ENGLAND

STEERING DEVICE FOR SWIVELING BOGIES OF ROAD VEHICLES

Application filed September 15, 1930, Serial No. 482,091, and in Great Britain September 23, 1929.

This invention relates to vehicles mounted on swiveling bogies of the type which have steerable wheels operated by a movable connection between the steering mechanism on the bogie and a controlling point which moves according to relative angular movement between the platform or vehicle chassis, or according to the movement of a drawbar (such as in trailers) for automatic steering, or alternatively which is moved by manually-operated steering gear mounted on the platform. In the case of automatic movement due to the relative angular movement aforesaid, the controlling point may be located on the bogie or upper platform chassis as explained later.

For instance, it is already known to direct the steering wheels automatically by means of a pivotal connection between the platform and the steering rods directing the wheels, whereby the amount of angular displacement of the wheels with regard to the bogie chassis is kept in definite relation to the amount of angular displacement between the longitudinal axis of the platform and bogie chassis respectively.

Reverse running of the vehicle, however, raises a problem, in that the connection to the platform needs to be on the side of the bogie pivot opposite to that normally employed. Further, in many cases, the angular displacement of the wheels required in reversing is smaller compared with that necessary when travelling forward.

In connection with this problem it has been proposed to introduce two connections from the steering gear on the bogie respectively extending to a pair of controlling points either one of which can be thrown into operative connection, the other working idly, as may be desired. In the present invention the means provided to put one particular connection into action simultaneously releases the other to move idly.

Thus, according to the invention such a duplicated steering connection represents a universal steering device capable of ready and simple operation for swiveling bogies applicable in two directions and it can be applied as well to reversible trailers as to self-propelling vehicles.

Where the controlling points are on the platform and/or drawbar, the common or mutual basis for the two steering connections is pivotally connected to the bogie chassis and its body acts as a constant pivot for the two steering bars or levers whilst the other end of both levers can be connected to the platform or other member by means of controlling points, allowing for sliding so as to provide for longitudinal differences which appear during the angular displacement between bogie and platform.

In order that the invention may be better understood, reference will now be made to the accompanying drawings, merely as an example, wherein:

Figure 1 is a plan view of the invention as applied to a front bogie showing the vehicle about to enter a curve, Figure 2 is a similar view of the rear bogie which has not yet entered the curve, Figure 3 is a plan view of the invention as applied to a front bogie after the same has entered the curve, Figure 4 is a similar view of the rear bogie after the bogie has entered the curve, Figures 5, 6 and 7 show the essential parts of the invention separately, Figure 8 is an assembled view of the essential parts.

Figure 9 is a section on the section IX-IX, and

Figure 10 is a plan view of a modification.

Referring to the drawings, Figs. 1 and 4, the bogie carriage 1 is mounted by means of a king pin 2 on the vehicle chassis 3, said bogie carriage having two non-steerable wheels 4 and two steerable wheels 5. Two steering rods 6 are attached to the wheels 5 by suitable connecting arms 7, so that a push or pull on the rods will turn said wheels.

A mutual member swiveling on the bogie comprises a cup-like member 8 having an arm connected to the steering rods at pivotal points 9 into which the disc like ends of the steering bars or levers hereinafter disclosed, fit concentrically and revolubly, the whole being covered by a cap 8a (Fig. 9).

Two steering bars are provided for each bogie consisting of a front bar 11, and a rear bar 12, the front bar being longer than the rear bar, each having a central slot 13, 14, at the one end and each being disc shaped and having a slot 15 or 16 and V-shaped openings thereto as shown (Figs. 6, 7) at the other end.

The shape of the disc-like ends and of the slots is such that the bars are capable of being mounted together with the member 8 with one central slot (Figs. 8, 9). When assembled, the steering rods are pivotally attached to the points 9, and the slots 13, 14 of the steering bars are slidable on guide pins 17, 18, forming the control points hereinbefore mentioned. This pin and slot arrangement may be reversed. An imaginary pivot point is thus formed between the tow bars on the central member 8.

A sliding member and pin 19 engages the two bars 11, 12 and the central member 8, by means of the common slot formed between the slot 10 in said central member and the slotted disc-like ends of the bars. Said sliding member 19 is attached to cables 20, 21, running over pins 22, 23 on the bars, and connected, preferably through springs 24, 25, to an operating lever in such a manner that said sliding member may either be slid to the front of the groove, so engaging the central member 8 and the front bar 11, the bar 12 being rotatable by virtue of its V-shaped end, or slid to the rear groove, so engaging the central member 8 and the rear bar 12, the bar 11 being rotatable. In each case the bar not engaged will have no effect on the steering of the wheels, merely turning about the central member 8 and the control point or pin.

Considering Figs. 1 to 4, and assuming them to depict the front and rear of the same vehicle, and the vehicle is proceeding in the direction of the arrow, Figs. 1 and 2 showing the front bogie and Figs. 3 and 4 the rear bogie, the sliding member 19 in both figures is pulled forward, that is connecting the front bar 11, and the member 8 in Fig. 1, and the rear bar 12 and the member 8 in Fig. 3. In both cases the bar not connected is capable of rotation.

When the vehicle is proceeding forward and is turning, the front bogie turns about the king pin 2 and the wheels 5 will be steered due to the action of the front bar 11 and the member 8, the pin 17 being the control or pivot point, and the rear bar 12 will merely pivot, by virtue of its V-shaped end and the pin (now not acting as control point) and be idle. When the turn is transmitted to the rear bogie, said bogie turns about its king pin 2, and the wheels 5 are steered in exactly the same manner as the front bogie, except the bar 12 is engaged, the pin 18 being the control point, and the bar 11 being "free".

Now consider that it is desired to reverse the vehicle. The lever is operated, so that the sliding member 19 is pulled backwards, that is, connects with rear bar in Fig. 1 and the front bar in Fig. 2, with the central member 8. Thus the rear wheels in the above example, namely when proceeding forward, have become front wheels and are turned by the influence of the front bar 11 which was idle before, and the front wheels have become rear wheels, and are turned by the rear bar 12.

Thus it is obvious that, with regard to the required angular displacement of the wheels 5, either bogie carriage may become a "front" or "rear" bogie at will.

Preferably the front lever 11 on the front bogie may be made steerable independently of the swing of the bogie by mounting the control point or pin 17 on a threaded member 26 engaging a screw bar 27 capable of being operated through suitable gearing 28 by a hand wheel 29 (shown in Fig. 1 dotted). Or, in trailers, the control point may be mounted on a drawbar pivoting on the platform or on the bogie (see element 30 dotted in Fig. 2).

In this way the pin 17 may be given a lateral movement with respect to the chassis, and so may be moved off the longitudinal axis of said chassis.

It is to be understood that the vehicle need only have one bogie, in which case the operating lever transfers the control point.

I claim:

1. A vehicle mounted on swiveling bogies having steerable wheels operated by a movable connection between a steering mechanism on the bogie and a movable controlling means the said steerable wheels being connected to duplicate controlling points by duplicate connections, either of which may be put into an operable condition when required so that steering may be effected by one or other of the controlling points as required, the means provided to put one particular connection into action operating simultaneously to release the other to move idly.

2. A vehicle according to claim 1 wherein the duplicate connections are so constructed and arranged that they respectively produce varying degrees of movement of the steerable wheels for a given angular displacement between bogie chassis and platform or vehicle chassis.

3. A vehicle mounted on swiveling bogies having steerable wheels operated by a movable connection between a steering mechanism on the bogie and a movable controlling means the said steerable wheels being connected to duplicate controlling points by duplicate connections, either of which may be put into an operable condition when required so that steering may be effected by one or other of the controlling points as required, the means provided to put one particular connection into action operating simultaneously to release the other to move idly, while steering rods operating the steerable wheels are moved by a member swiveling on the bogie, said member carrying the duplicate connections which are mounted in such a way that each can be made to rotate freely in the member or fixedly therewith when movement is imparted thereto by their controlling points.

4. A vehicle mounted on swiveling bogies having steerable wheels operated by a movable connection between a steering mechanism on the bogie and a movable controlling means the said steerable wheels being connected to duplicate controlling points by duplicate connections, either of which may be put into an operable condition when required so that steering may be effected by one or other of the controlling points as required, the means provided to put one particular connection into action operating simultaneously to release the other to move idly, while steering rods operating the steerable wheels are moved by a member swiveling on the bogie, said member carrying the duplicate connections which are mounted in such a way that each can be made to rotate freely in the member or fixedly therewith when movement is imparted thereto by their controlling points, the duplicate connections being so constructed and arranged, that they respectively produce varying degrees of movement of the steerable wheels for a given angular displacement between bogie chassis and platform or vehicle chassis.

5. A vehicle according to claim 3, wherein the connections are levers extending in opposite direction, normally substantially along the longitudinal axis of the vehicle, and having their respective outer ends pivoted at a controlling point on the main vehicle chassis or platform or to a drawbar swiveling thereon.

6. A vehicle according to claim 4, wherein the connections are levers extending in opposite direction, normally substantially along the longitudinal axis of the vehicle, and having their respective outer ends pivoted at a controlling point on the main vehicle chassis or platform or to a drawbar swiveling thereon.

7. A vehicle mounted on swiveling bogies having steerable wheels operated by a movable connection between a steering mechanism on the bogie and a movable controlling means the said steerable wheels being connected to duplicate controlling points by duplicate connections, either of which may be put into an operable condition when required so that steering may be effected by one or other of the controlling points as required, the means provided to put one particular connection into action operating simultaneously to release the other to move idly, the steerable wheels being operated by steering rods which are moved by a member swiveling on the bogie and carrying the duplicate connections, which connections are levers extending in opposite directions normally substantially along the longitudinal axis of the vehicle, and having their respective outer ends pivoted at a controlling point on the main vehicle chassis or platform or to a drawbar swiveling thereon, and which connections are mounted in such a way that they each can be made to rotate freely in the member or fixedly therewith when movement is imparted thereto by their controlling points and further in such a way at their respective controlling points so as to allow for longitudinal displacement by means of a pin and slot arrangement on the platform drawbar or the like and the lever of the connection.

8. A vehicle mounted on swiveling bogies having steerable wheels operated by a movable connection between a steering mechanism on the bogie and a movable controlling means the said steerable wheels being connected to duplicate points by duplicate connections, either of which may be put into an operable condition when required so that steering may be effected by one or other of the controlling points as required, the means provided to put one particular connection into action operating simultaneously to release the other to move idly, while the duplicate connections are so constructed and arranged that they respectively produce varying degrees of movement of the steering wheels for a given angular displacement between bogie chassis and platform or vehicle chassis, the steerable wheels being operated by steering rods which are moved by a member swiveling on the bogie, said member carrying the duplicate connections which are mounted in such a way that each can be made to rotate freely in the member or fixedly therewith when movement is imparted thereto by their controlling points, the duplicate levers being further constructed of different lengths between their mutual pivot on the bogie and their respective pivots at the controlling points.

9. A vehicle mounted on swiveling bogies having steerable wheels operated by a movable connection between a steering mechanism on the bogie and a movable controlling means, the said steerable wheels being connected to duplicate controlling points by duplicate lever connections, either of which may be put into an operable condition when required so that steering may be effected by one or other of the controlling points as required, the means provided to put one particular connection into action operating simultaneously to release the other to move idly, while steering rods operating the steerable wheels are moved by a member swiveling on the bogie, said member carrying the duplicate lever connections which are mounted in such a way that each can be made to rotate freely in the member or fixedly therewith when movement is imparted thereto by their controlling points, the mutual member swiveling on the bogie comprising a cup-like member, having an arm connected to the steering-rods, into which cup-like members fit concentrically and revolubly two disc-like ends formed on the lever connections respectively, there being slide means in the three superimposed elements, whereby a sliding element can bring a slideway of the cup into locking engagement with a slideway of one of the lever ends and simultaneously into a free play position in an opening in the other lever end.

10. A vehicle according to claim 9 comprising distant-control means to move the sliding element from a point on the vehicle platform.

11. A vehicle mounted on two swiveling bogies, each bogie having steering wheels on one end only, both bogies being arranged under the vehicle oppositely to each other in such a way that the two extremities of the vehicle are supported by the steering wheels of the two bogies; controlling means to reverse the steering mechanism of said bogies, so that in either direction the front-bogie steering wheels are operated by a controlling point moved by a handwheel or by a drawbar, and the rear bogie steering wheels are operated by a controlling point moved by the platform.

In testimony whereof I affix my signature.

HENRI WOUTER JONKHOFF.